(12) United States Patent
Fanourakis et al.

(10) Patent No.: US 9,108,691 B2
(45) Date of Patent: Aug. 18, 2015

(54) TRACTOR/TRAILER COMBINATIONS

(75) Inventors: Angelo Fanourakis, Telford (GB);
Bachrun Mason, Telford (GB);
Matthew Hill, Telford (GB)

(73) Assignee: GKN Autostructures Limited, Telford Shropshire (GB)

( * ) Notice: Subject to any disclaimer, the term of this patent is extended or adjusted under 35 U.S.C. 154(b) by 0 days.

(21) Appl. No.: 13/993,830

(22) PCT Filed: Dec. 15, 2011

(86) PCT No.: PCT/GB2011/052488
§ 371 (c)(1),
(2), (4) Date: Oct. 2, 2013

(87) PCT Pub. No.: WO2012/080738
PCT Pub. Date: Jun. 21, 2012

(65) Prior Publication Data
US 2014/0025245 A1  Jan. 23, 2014

(30) Foreign Application Priority Data

Dec. 16, 2010 (GB) .................................. 1021362.7

(51) Int. Cl.
*B60W 20/00* (2006.01)
*B62D 53/06* (2006.01)
*B62D 53/08* (2006.01)
*B62D 59/04* (2006.01)
*B62D 61/12* (2006.01)
*B60K 1/04* (2006.01)

(52) U.S. Cl.
CPC ............... *B62D 53/06* (2013.01); *B62D 53/08* (2013.01); *B62D 53/0871* (2013.01); *B62D 59/04* (2013.01); *B62D 61/12* (2013.01); *B60K 2001/0444* (2013.01); *B60W 20/00* (2013.01); *B60W 2510/083* (2013.01); *B60W 2530/22* (2013.01); *B60Y 2200/147* (2013.01)

(58) Field of Classification Search
None
See application file for complete search history.

(56) References Cited

U.S. PATENT DOCUMENTS

| 4,231,442 A | 11/1980 | Birkeholm |
| 5,418,437 A | 5/1995 | Couture et al. |
| 6,234,508 B1 * | 5/2001 | Tuttle et al. ................ 280/406.1 |

(Continued)

FOREIGN PATENT DOCUMENTS

| CA | 2457216 | 8/2004 |
| DE | 4405709 | 8/1995 |

(Continued)

*Primary Examiner* — John R Olszewski
*Assistant Examiner* — James M McPherson
(74) *Attorney, Agent, or Firm* — Boyle Fredrickson, S.C.

(57) ABSTRACT

A tractor unit (10) and a trailer unit (14) are connected by a connecting pin (33) on one unit (12, 14) which is in use received in an opening (21) in a connecting surface of the other unit, the connecting pin (33) including a sensor device (70) to sense loads imposed on the connecting pin (33) as the trailer unit (14) tends to decelerate or accelerate relative to the tractor unit (12), there being a control system, including a controller (65) which receives signals from the sensor device (70) representative of loads imposed on the connecting pin (33), and at least one electrical motive machine (50) is controlled, the machine (50) being capable of being electrically driven by power from an electrical storage device to provide drive to drive at least one ground engaging wheel (45a, 45b) and of generating electrical power for storage by an electrical storage device (58), such as to minimize the loads imposed on the connecting pin (33).

29 Claims, 3 Drawing Sheets

(56) References Cited

U.S. PATENT DOCUMENTS

| | | | |
|---|---|---|---|
| 6,955,098 B2* | 10/2005 | Schulze et al. | 73/862.625 |
| 7,147,070 B2* | 12/2006 | Leclerc | 180/14.2 |
| 8,164,300 B2* | 4/2012 | Agassi et al. | 320/104 |
| 8,215,436 B2* | 7/2012 | DeGrave et al. | 180/165 |
| 8,474,326 B2* | 7/2013 | Kempainen et al. | 73/856 |
| 2003/0106369 A1* | 6/2003 | Foley et al. | 73/121 |
| 2005/0000739 A1 | 1/2005 | Leclerc | |
| 2006/0290101 A1* | 12/2006 | Rosenberg et al. | 280/507 |
| 2007/0193795 A1* | 8/2007 | Forsyth | 180/65.4 |
| 2007/0194557 A1 | 8/2007 | Caporali et al. | |
| 2007/0204594 A1* | 9/2007 | Ishii | 60/274 |
| 2008/0242512 A1* | 10/2008 | Kim et al. | 482/8 |
| 2010/0065344 A1* | 3/2010 | Collings, III | 180/2.1 |
| 2010/0154449 A1* | 6/2010 | Stover et al. | 62/236 |
| 2010/0174484 A1* | 7/2010 | Sivasubramaniam et al. | 701/213 |
| 2010/0327600 A1* | 12/2010 | Koelsch et al. | 290/1 A |

FOREIGN PATENT DOCUMENTS

| | | |
|---|---|---|
| DE | 10131935 | 3/2002 |
| GB | 2466086 | 6/2010 |
| WO | 86/04310 | 7/1986 |
| WO | 91/12160 | 8/1991 |
| WO | 2008/086087 | 7/2008 |

* cited by examiner

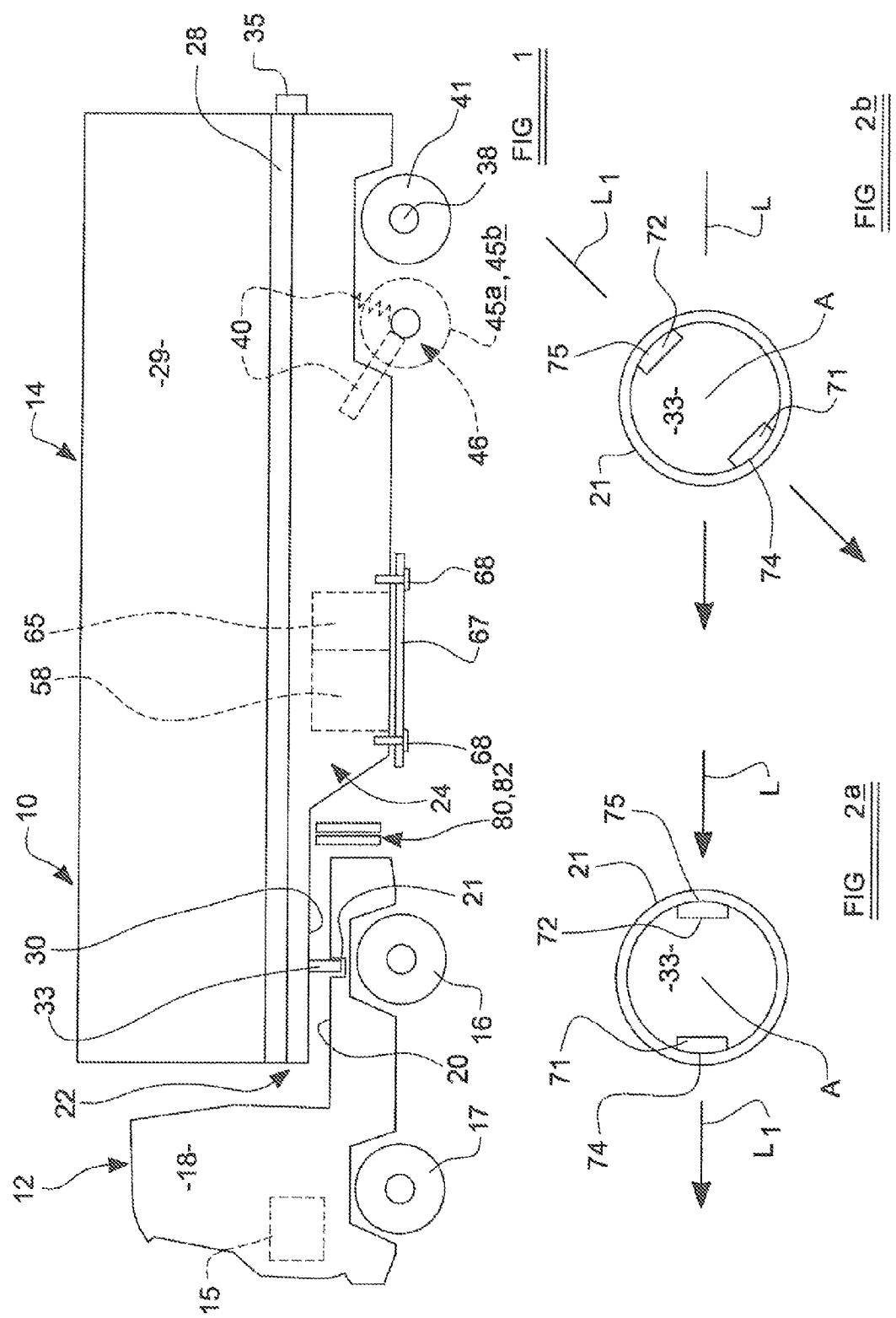

TRACTOR/TRAILER COMBINATIONS

DESCRIPTION OF INVENTION

This invention relates to a combination of a tractor unit and a trailer unit which is particularly but not exclusively for on-road use.

Such combinations are well known. A tractor unit may be coupled to any one of a plurality of trailer units, to pull a trailer unit from one location to a destination.

The experience of driving a tractor unit when a trailer unit is highly loaded can, to the driver, be quite different to driving a tractor unit without a trailer unit or with only a lightly loaded trailer unit. For example, upon starting off, or when seeking to accelerate, the presence of a highly loaded trailer unit will result in a much slower acceleration than for a tractor unit alone, or a combination with a less highly loaded trailer unit. Conversely, when braking, or trying to maintain a steady speed when travelling downhill, it can be much more difficult to control the deceleration and speed of the combination, than where no, or only a more lightly loaded trailer unit is coupled to the tractor unit.

For particularly on-road applications, manoeuvring e.g. steering, a tractor unit and trailer unit combination when the trailer unit is highly loaded can also provide a very different experience to the driver, than when the trailer unit is unloaded or more lightly loaded.

So-called "powered trailers" are known, for example from WO03/00538 in which drive wheels provided on the trailer unit can be driven by hydraulic motors, to provide additional drive to support the motive effort of the tractor unit. US2001003393 discloses another example of a powered trailer with an engine provided on the trailer.

In WO86/04310 there is disclosed the provision of a powered "slave unit", which again utilises engine driven hydraulic motors to drive wheels of the slave unit, to supplement traction achieved by a tractor. This proposal suggests that a hydraulic pump which provides hydraulic fluid to the drive motors, can be deactivated upon deceleration of the tractor to assist deceleration. However this is in an uncontrolled manner.

GB2466086 discloses a trailer with electric motors which can be driven in response to signals from sensors which are load cells provided on a draw bar, in order to provide side-to-side stability.

According to a first aspect of the invention we provide in combination, a tractor unit and a trailer unit, the tractor unit and the trailer unit being coupled by a connection device which permits of relative angular movement between the tractor unit and the trailer unit about a generally upright axis, the connection device including a connecting pin which extends from a connecting surface of one of the trailer unit and the tractor unit, and is in use received in an opening in a connecting surface of the other of the tractor unit and the trailer unit, the connecting pin including a sensor device to sense loads imposed on the connecting pin as the trailer unit tends to decelerate or accelerate relative to the tractor unit, there being a control system, including a controller, the controller receiving signals from the sensor device of the connecting pin representative of the loads imposed on the connecting pin, the trailer unit including a pair of ground engaging wheels, one at each side of the trailer unit, at least one electrical motive machine which is capable of being electrically driven by power from an electrical storage device to provide drive to drive at least one of the ground engaging wheels to tend to accelerate the trailer relative to the tractor unit, and of generating electrical power for storage by the electrical storage device, in response to the trailer unit tending to accelerate relative to the tractor unit, and wherein the controller in use, controls the electrical motive machine in response to the signals from the sensor device to minimise the loads imposed on the connecting pin.

By virtue of the present invention, the driving experience when driving the combination is more consistent whether the trailer unit is highly or less highly loaded, by virtue of the controller actively controlling the at least one electrical motive machine to minimise the loads imposed on the connecting pin.

Moreover, by using an electrical motive machine to drive the ground engaging wheel or wheels of the trailer unit when the trailer unit tends to decelerate relative to the tractor unit, and to recover energy by generating power when the trailer unit tends to accelerate relative to the tractor unit, thus to brake the trailer unit, the invention provides for considerable fuel efficiencies during driving of the combination.

It will be appreciated that when the electrical motive machine is controlled to generate electrical power, this will provide some drag on the trailer which will assist braking.

The connecting pin of the connection device preferably is provided on the trailer unit, and the opening in which the connecting pin is in use received is provided in a connecting surface of the tractor unit.

The controller of the control system may be provided on the trailer unit. The electrical storage device is preferably also provided on the trailer unit.

In this way, desirably the trailer unit is substantially independent of the tractor unit so far as controlling the electrical motive machine is concerned. Thus there is no need to transfer control data between the tractor unit and the trailer unit, and the operation of the trailer unit in which the wheel or wheels are driven by the electrical motive device, or the electrical motive device is driven, is independent of the tractor unit.

The sensor device may include a first sensor part and a second sensor part, the first and second sensor parts being located to sense loads at diametrically opposite positions of the connecting pin. Preferably, when the tractor unit and the trailer unit are in longitudinal alignment i.e. drive wheels of the tractor unit are in straight ahead positions in line with the ground engaging wheels of the trailer unit, the first sensor part senses loads at a forwardly facing region of the connecting pin as the trailer unit tends to decelerate relative to the tractor unit, and the second sensor part senses loads at a rearwardly facing region of the connecting pin as the trailer unit tends to accelerate relative to the tractor unit.

Connecting pins for connecting tractor/trailer combinations for relative turning are well known, and such pins, especially where provided on the trailer unit, are commonly referred to in some applications, as king pins.

The first and second sensor parts may be carried by the connecting pin, e.g. on a surface of the connecting pin, but preferably are within the connecting pin. In each case, as the trailer unit turns relative to the tractor unit, the sensor devices may turn with the trailer unit.

Therefore it will be appreciated that as the trailer unit turns relative to the tractor unit about the upright axis, the magnitude of any fore and aft loads imposed on the connecting pin as a result of the trailer unit tending to accelerate or decelerate relative to the tractor unit, will be dependent upon the relative angle between the tractor unit and the trailer unit, and thus the controller may compensate for this relative angle automatically, as load signals received by the controller from the sensor device will commensurately reduce as the relative angle between the tractor and trailer units increases. Thus there is no serious risk of the controller controlling the electrical motive machine in such a way as to cause instability, for example if the or each wheels of the trailer unit was driven while there existed too small an included angle between the tractor unit and the trailer unit, which could lead to so called "jack-knifing".

The sensor device is preferably of the kind which senses local strains by changing electrical resistance but any other sensor device may be provided as required.

The electrical motive machine may be of any desired kind and may for example have a fixed or rotating stator, be brushed or brushless, be a direct current, alternating current or switched reluctance machine. Preferably the electrical motive machine is a brushless d.c. machine. In each case the electrical motive machine is capable of providing variable drive to the or each ground engaging wheel when in drive mode, and is capable of providing a variable resistance braking effect when operated in electrical generating mode.

To enable drive to or from the ground engaging wheel or wheels to be isolated, preferably there is provided a clutch apparatus. Although a clutch may be integrated with the electrical motive machine, the clutch apparatus may include a mechanical clutch between the wheel and the electrical motive machine. In each case, the clutch apparatus may be controllable to engage and disengage drive by the controller, as required. For example, the controller may engage and disengage the clutch to fulfil control criteria of a control algorithm.

For example in the event that the state of charge of the electrical power of the electrical power storage device becomes low, the controller may, in accordance with the control algorithm, control the clutch apparatus and the electrical motive machine such as to increase or maximise the generation of electrical power for storage, notwithstanding that this may at least temporarily fail to minimise or even contribute to loads imposed on the connecting pin, so that the electrical power of the electrical power storage device may be restored.

Additionally or instead of the controller controlling the combination in accordance with a control algorithm which includes only local criterion such as the immediate state of charge of the electrical power storage device, the control algorithm may be adaptive to non-local criteria.

In one embodiment the control system has an input to receive information relating to the geographic position of the combination which provides a positional input, and an input to receive route information relating to the proposed route of the combination, and the control system includes a control algorithm which uses the positional and route information in a control regime which seeks to ensure that the electrical storage device does not become depleted of electrical power beyond a predetermined state of charge as the combination travels from a starting location to a destination, along the proposed route.

The positional and/or route information could use information relating to the number and severity of up and down inclines, and turns and straights along the proposed route, so that the control algorithm can predict from such information, the state of charge of the electrical storage device along the proposed route, and predict the electrical power which will be required along the proposed route, in order to operate the combination to minimise loads imposed on the connecting pin.

The positional information may be provided by a Global Positioning System ("GPS"), although any other device which enables the position of the combination to be located geographically could alternatively be used, such as a telephonic or radio network for example.

The controller may be responsive to other non-local criteria, such as for example traffic congestion information which may be provided to the combination, from a remote location.

In a preferred embodiment the trailer unit includes a storage area to accommodate the electrical storage device which may include one or a plurality of batteries. For example only, the trailer unit may include a decking for carrying a load to be transported, and the decking may be supported by a chassis which may include chassis members, such as a pair of chassis members which extend longitudinally along the trailer unit. The storage area may be provided between the pair of longitudinal extending chassis members. The electrical storage device may be supported by a cradle which is readily mountable and dismountable relative to the chassis members, for maintenance, whilst providing a safe and secure area for storage beneath the decking.

As electrical storage devices can be heavy, the storage area desirably is positioned generally centrally across the trailer unit width, and between the wheels and the connecting pin, for stability, but alternatively units, such as batteries for the electrical storage device may be distributed, e.g. uniformly, over the trailer. The exact configuration may depend on the geometry of the units.

If required, supplementary electrical power may be generated by one or more of a solar power collection device, and a wind power collecting device.

The controller of the control system may also be stored in the storage area, or in a different storage area as required.

It is common practice for ground engaging wheels on trailer units to be braked and the brakes to be controlled by a driver of the tractor unit. Desirably, in a combination of the invention the ground engaging wheels of the trailer unit are brakable by one or braking devices, the braking devices being controlled by a brake controller in response to braking commands provided by a driver in a cab of the tractor unit. However desirably, to ensure that the controller does not override or negate braking, or interfere with the proper operation of any ABS or the like system provided, preferably the controller of the control system at least suspends its control of the electrical motive machine and/or the clutch apparatus where provided, such as would otherwise provide drive to the at least one ground engaging wheel, when the brakes are applied.

If desired, where appropriate, the controller may still control the electrical motive machine and/or the clutch apparatus to generate electrical power for storage, when the brakes are applied.

The ground engaging wheels of the trailer unit, at least one of which is driven by the at least one electrical motive machine, the at least one electrical motive machine, and the clutch where provided, may be provided as an auxiliary unit which is in use secured to a chassis of the trailer unit by a suspension. Thus the invention may readily be implemented by retrofitting the auxiliary unit on an existing trailer unit.

In a preferred embodiment, both of the pair of ground engaging wheels are driven by the at least one electrical motive machine, with there being a clutch apparatus associated with each wheel, which clutch apparatuses are controlled by the controller to engage and disengage drive to the wheel or wheels.

If desired, an electrical motive machine may be provided for each ground engaging wheel which is driven.

According to a second aspect of the invention we provide a trailer unit for the combination of the first aspect of the invention.

According to a third aspect of the invention we provide a method of adapting a trailer unit which in use is coupled to a tractor unit, for use as trailer unit of a combination according to any one of the preceding claims, the method including providing the trailer unit with a connecting pin which extends from a connecting surface of the trailer unit, which connecting pin is in use, received in an opening provided on a tractor unit, to provide a connection device which permits of relative angular movement between the tractor unit and the trailer unit about a generally upright axis, the connecting pin including a sensor device to sense loads imposed on the connecting pin as trailer unit in use, tends to decelerate or accelerate relative to the tractor unit, mounting on a chassis of the trailer unit an auxiliary unit which includes at least one electrical motive machine which is capable of being electrically driven to provide drive to at least one of a pair of ground engaging wheels of the auxiliary unit, and of generating electrical power, mounting on the trailer unit a controller of a control system, connecting the controller to receive signals from the sensor device of the connecting pin, mounting on the chassis an electrical storage device to provide power to the electrical motive machine for drive, and to store power generated by the electrical motive machine.

The combination thus adapted may have any of the features of the combination of the first aspect of the invention.

The method may include first removing from the trailer unit an existing axle, and replacing the existing axle with the auxiliary unit.

According to a fourth aspect of the invention we provided a method of operating a combination according to the first aspect of the invention, which method includes controlling the electrical motive machine by providing electrical power from the electrical storage device to drive the at least one of the pair of ground engaging wheels or permitting the electrical motive machine to generate electrical power for storage in the electrical storage device in accordance with a control algorithm to minimise loads imposed on the connecting pin in use.

According to a fifth aspect of the invention we provide a connection device for providing a connection between a tractor unit and a trailer unit which permits of relative angular movement between the tractor unit and the trailer unit about a generally upright axis, the connection device including a connecting pin and an opening, the connecting pin extending from a connecting surface of one of the trailer unit and the tractor unit, and being in use, received in an opening in a connecting surface of the other of the tractor unit and the trailer unit, the connecting pin including a sensor device to sense fore and aft loads imposed on the connecting pin as the trailer unit tends to decelerate or accelerate relative to the tractor unit.

The connection device may have any of the features of the connection device of the combination of the first aspect of the invention.

Embodiments of the invention will now be described with reference to the accompanying drawings in which:—

FIG. 1 is an illustrative side view of a combination of a tractor unit and a trailer unit in accordance with the invention;

FIG. 2*a* is a diagrammatic plan view of part of a connection device for use in the combination of FIG. 1, when the tractor unit and the trailer unit are aligned;

FIG. 2*b* is a view similar to FIG. 2*a* but showing the connection device when the tractor unit is not in alignment with the trailer unit;

Figure 3:
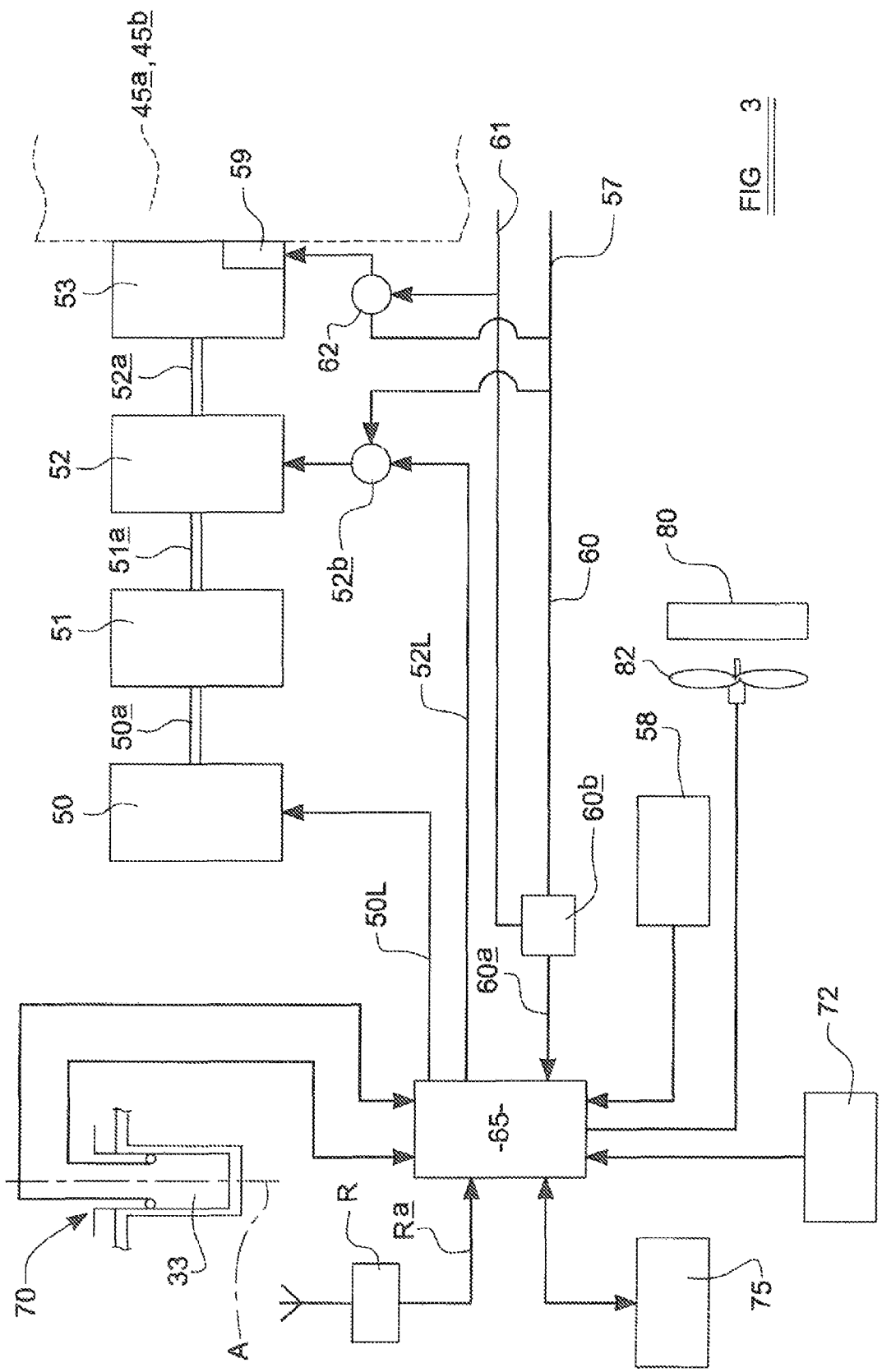
FIG. 3 is a diagrammatic representation of part of an auxiliary unit and other parts of the trailer unit of the combination of the invention.

Referring to the drawings a combination 10 of a tractor unit 12 and a trailer unit 14 is shown.

The tractor unit 12 includes an engine 15 which drives a pair of drive wheels 16, or as desired each of two pairs of ground wheels 16, 17. The tractor unit 12 includes a driver's cab 18 from where the driver may drive the tractor unit 12, controlling the engine 15 e.g. through a transmission, and issue braking commands, as hereinafter described, to effect braking of the combination 10.

In another example, the tractor unit 12 may be driven by electrical and/or hydraulic motors which may be powered by an engine, or any other power device.

The tractor unit 12 includes a connecting surface 20 which in the example is generally upwardly facing, and includes an opening 21 which provides one part of a connection device 22 by means of which the tractor unit 12 and the trailer unit 14 are coupled.

The trailer unit 14 in the example includes a chassis 24 which may include a pair of longitudinally extending chassis members which are spaced apart, and extend along all or substantially the entire length of the trailer unit 14. The chassis members are typically steel beams which give a decking 28 carried by the chassis 24, substantial rigidity, allowing the decking 28 to support heavy loads. The decking 28 may be provided as a combination of timber or other planked or sheet material and further metal chassis members of the chassis 24, as required.

In another example, the trailer unit 14 need not have such chassis 24, but could, for another example, be of moncoque construction, or be of a space frame construction.

In the example, the trailer unit 14 includes a flexible covering 29 carried on a support framework (not shown), but the trailer unit 14 may simply have a flat uncovered decking 28 for loads, may carry a container, or may be a permanently covered structure, as required.

The trailer unit 14 includes a connecting surface 30 which in the example is downwardly facing, and from which connecting surface 30 there extends downwardly, a connecting pin 33 (commonly known as a king pin), which in use, is received in the opening 21 in the connecting surface 20 of the tractor unit 12, the connecting pin 33 providing a second part of the connection device 22.

When the connecting pin 33 is received in the opening 21, the tractor unit 12 and the trailer unit 14 are mechanically coupled in combination typically with the connecting surfaces 20, 30 in engagement. Other services need to be connected between the tractor unit 12 and the trailer unit 14, such as an electrical service which ensures that brake lights 35 provided on the trailer unit 14 are illuminated when the driver applied the brakes from within the cab 18, and a pneumatic service which is required to release brakes of the trailer unit 14.

It will be appreciated that conventionally the tractor unit 12 may include a data bus, known as a CAN BUS, so that a management system of the tractor unit 12 can control the various functions of the tractor unit 12 in accordance with operator commands, and in response to sensing operating parameters of the tractor unit 12.

It is known to provide for some limited connectivity between the CAN BUS of a tractor unit 12, and a coupled trailer unit 14. As will be appreciated from the explanation below, the combination of the present invention operates without requiring any more sophisticated connectivity between the CAN BUS of the tractor unit 12, and the trailer unit 14, although additional features may more readily be realised, or realised otherwise than as given by way of example in this description, though greater connectivity i.e. more data being able to be passed between the tractor unit 12 and trailer unit 14 than is available with current connections.

The trailer unit 14 includes in this example, an axle 38 which carries at least one pair of ground engaging wheels 41. The axle 38 carrying the ground engaging wheels 41 is conventional, and may be carried from the chassis 24 by a suspension, such as a trailing or leading arm suspension.

As thus far described, the combination 10 is largely conventional.

In accordance the present invention the trailer unit 14 includes a further pair of ground engaging wheels 45a, 45b, which in the example are provided by an auxiliary unit 46.

In one embodiment, the auxiliary unit 46 is provided as a replacement for a second conventional axle, which may be removed from the trailer unit 14 to permit the auxiliary unit 46 to be installed. The auxiliary unit 46 is provided in the manner of an axle, mounted on the chassis 24, desirably via a suspension arrangement 40. As illustrated in FIG. 3, the auxiliary unit 46 may include for each ground engaging wheel 45a, 45b at either side of the trailer unit 14, an electrical motive machine 50 which is mechanically coupled via a transmission 51 and a clutch 52 to a hub 53 to which one of the ground engaging wheels 45a, 45b is mounted. Thus in FIG. 3, the auxiliary unit 46 will include a substantially mirror image arrangement (not shown) of another electrical motive machine 50, transmission 51, clutch 52 and hub 53, for the other ground engaging wheel 45b of the auxiliary unit 46.

Most desirably, the entire auxiliary unit 46 is mounted to the chassis 24 by simple fastenings, in such manner that the entire auxiliary unit 46 may readily be mountable and dismountable as a single unit e.g. in the same manner as the conventional axle which is replaced by the auxiliary unit 46. Thus a conventional trailer unit 14 may readily be retrofitted with the auxiliary unit 46 without requiring major modification to the existing structure of the trailer unit 14.

In the example, each electrical motive machine 50 is capable of being driven electrically by power from an electrical storage device 58, to provide drive to drive the respective ground engaging wheel 45a, 45b and of generating electrical power for storage by the electrical storage device 58.

Any suitable kinds of electrical motive machine 50 may be required, such as a permanent or non-permanent magnet, fixed and/or moving stator, brushed, brushless d.c, a.c. motor/generator. A brushless d.c. electrical motive machine 50 is preferred. Each electrical motive machine 50 is mechanically connected to its respective transmission 51 by a shaft 50a.

For such known motors, the transmission 51 for each ground engaging wheel 45a, 45b is provided to enable a rotor of the electrical motive machine 50 which drives it, to be rotated at high revolutionary speeds, while the ground engaging wheel 45a or 45b turns at a slower speed. For another kind of motor, the necessary power may be developed with a different, or even no transmission.

The transmission 51 is mechanically connected by a shaft 51a to the respective clutch 52.

The clutch 52 for each ground engaging wheel 45a, 45b is provided for a purpose hereinafter described, to enable to the drive path between the electrical motive machine 50 and the ground engaging wheel 45a or 45b to be interrupted when required. The clutch 52 is mechanically connected by a shaft 52a to the hub 53 for the wheel 45a or 45b.

The hub 53 provides a convenient mounting for the ground engaging wheel or wheels 45a or 45b, and each hub 53 also provides a braking device 59 such as a drum or disc braking device, which typically is spring applied, and is released by a pneumatically operated or other actuator. The braking device 59 thus preferably is fail safe "on".

In another example, the braking device 59 may include a hydro-pneumatic device whereby the brake, typically a disc brake, is applied by hydraulic pressure controlled by a pneumatic signal.

In another example, an inboard axle brake may be provided in addition to or instead of the hub braking device 59.

In the example, when coupling the tractor unit 12 and the trailer unit 14 with the connection device 22, and other services are connected between the tractor unit 12 and the trailer unit 14, a supply of pneumatic pressurised fluid 57 i.e. air, from the tractor unit 12 is connected to the trailer unit 14, together with a control line 61 which controls the flow of the pneumatic fluid to the brakes of the axle 38 which carries the ground engaging wheels 41 which are not of the auxiliary unit 46. The control line 61 typically would include a valve device, possibly with ABS functionality, to control the flow of the pneumatic fluid to the brakes.

When providing the combination of the invention, desirably a connection from the pneumatic fluid supply 57 is made to a brake actuating line 60 which extends to the auxiliary unit 46, to provide pressurised pneumatic fluid to release the braking devices 59 of the hubs 53 of the auxiliary unit 46.

The trailer unit 14 is fitted, for each wheel 45a, 45b with a control valve 62 which may have ABS functionality, which is operated by a signal, which may be pneumatic or electrical as required from control line 61, to control the application and release of the braking devices 59 of the hubs 53.

To provide a combination in accordance with the invention, in addition to mounting the auxiliary unit 46 on the chassis 24 and providing the usual service connections, and including to the pneumatic fluid supply 57, and the control line 59, the electrical storage device 58 is mounted on the trailer unit 14.

To guard the electrical storage device 58 in the event of a road accident, preferably the electrical storage device is mounted beneath the trailer unit 14 decking 28, between the longitudinally extending chassis members 25, 26. Conveniently the electrical storage device 58 is supported in a storage area on a cradle 67 which is readily mountable to the chassis members 25, 26 or otherwise to the chassis 24, by fasteners 68 which are easily accessible and releasable. Thus the cradle 67 and electrical storage device 58 may be removed as a unit for ease or maintenance, and easily fitted to an existing trailer unit 14 when adapting the existing trailer unit 14 in accordance with the second aspect of the invention.

As batteries of the electrical storage device 58 are heavy, desirably the electrical storage device 58 is mounted generally centrally width wise of the trailer unit 14, low down, and between the auxiliary unit 46 and the connection device 22, for stability.

In another example though, the electrical storage device 58 could be provided elsewhere on the trailer unit 14, such as uniformly distributed over the trailer unit 14, or the device 58 could be provided even above the decking 28, and at one or other longitudinal end of the chassis 24, if this is acceptable. Depending on the geometry of the units, e.g. battery units of the device 58, these may be stored within structures of the trailer unit 14.

Where the electrical storage device 58 is not provided on a cradle 67, they could be end-loaded into a storage compartment, or otherwise provided.

The combination 10 of the invention further includes a control system which includes at its heart, a controller 65. The controller 65 is responsive to various inputs as hereafter described, and controls the operation of the electrical motive machines 50 for each of the ground engaging wheels 45a, 45b, and the respective clutches 52.

The controller 65 typically will, include a processor, and require a power supply etc. In the present example the controller 65 is supported near or adjacent to the electrical storage device 29 in the same storage area, by the cradle 67, but in another example the controller 65 may be mounted elsewhere. The controller 65 may include more than one component or assembly of components, and these could be disparately mounted as desired. For example a master controller component which is operable to provide overall control but direct control to only one of the electrical motive machines/clutches 50/52 for one of the ground engaging wheels 45a of the auxiliary unit 46, may be supported by the cradle 67, and a slave controller component for controlling the other electrical motive machine/clutches 50/52 may be supported with the main controller component by the cradle 67, or elsewhere.

Whilst the connecting pin 33 of the combination of the invention permits relative angular movement between the tractor unit 12 and the trailer unit 14 about a generally upright axis A, the connecting pin 33 is not a conventional connecting (or "king") pin. This is because the connecting pin 33 includes a sensor device 70 which senses fore and aft loads imposed in relation to the trailer on the connecting pin 33 as in use, the trailer unit 14 tends to accelerate or decelerate relative to the tractor unit 12.

In the example, (see FIG. 2) the sensor device 70 includes a first sensor part 71 and a second sensor part 72. The sensor parts 70, 71 in the example are provided interiorly of the connecting pin 33 adjacent respectively, a forwardly facing region 74 of the connecting pin 33, and a rearwardly facing region 75 of the connecting pin 33, but could be carried by the pin 33 otherwise.

The first sensor part 71 is sensitive to loads imposed on the forwardly facing region 74 of the connecting pin 33 which occur as the trailer unit 14 tends to decelerate relative to the tractor unit 12, whilst the second sensor part 72 is sensitive to loads imposed on the rearwardly facing region 75 of the connecting pin 33 which occur as a result of the trailer unit 14 tending to accelerate relative to the tractor unit 12.

In FIG. 2 it can be seen that the respective first and second sensor parts 71, 72 are located at diametrically opposite fore and aft locations of the connecting pin 33.

When the tractor unit 12 and the trailer unit 14 are in longitudinal alignment as indicated in FIG. 1 and FIG. 2a, the forwardly facing region 74 of the connecting pin 33 and the rearwardly facing region 75 of the connecting pin 33 are aligned longitudinally of the combination 10, i.e. in the longitudinal direction L indicated in FIGS. 2a and 26.

As the ground wheels 17 (at least) of the tractor unit 12 are turned to effect steering in use, it will be appreciated that the forwardly and rearwardly facing regions 74, 75 of the connecting pin 33 will remain aligned with a longitudinal axis L1 of the trailer unit 14 as they are provided by the connecting pin 33 which is fixed to the trailer unit 14, and so the connecting pin 33 forwards and rearwards facing regions 74, 75 will rotate about the axis A relative to the opening 21 of the tractor unit 12.

The sensor device 70 is in one example of the kind in which an electrical current is passed through a conductor or semiconductor or the like, of each sensor part 71, 72, the resistance of which changes in response to changing load as the connecting pin 33 is subject to strains. Thus in the FIG. 2a situation in which the tractor unit 12 and the trailer unit 14 are in longitudinal alignment L, L1, loads on the forwardly and rearwardly facing regions 74, 75 of the connecting pin 33 occurring in response to trailer unit 14 tending to accelerate and decelerate relative to the tractor unit 12 will be maximised, but as the angle about axis A between the tractor unit 12 and the trailer unit 14 changes during steering for example, even though the trailer unit 14 may be tending to accelerate/decelerate at the same rate relative to the tractor unit 12, the respective first and second sensor parts 71, 72 will be subject to and thus sense less fore and aft load.

The loads sensed by the sensor device 70 e.g. indicated by changing sensor part resistance, thus not only depends upon the tendency of the trailer unit 14 to accelerate/decelerate relative to the tractor unit 12, but also on the angle about axis A, between the tractor and trailer units 12, 14, although it is not required actively to sense the angle about axis A between the trailer 14 and tractor 12 units or determine its magnitude.

Different kinds or sensor device 70 may be provided to that described. For one example, the sensor device 70 may include one or more piezoelectric sensor which generates a signal when subject to strain.

To provide cooling for the controller 65 and for the electrical storage device 58 if required, the trailer unit 14 is fitted with a cooling system which includes a radiator 80 though which hot coolant which has removed heat from the controller 65 and/or the electrical storage device 58 or elsewhere as required, is circulated. An electrically operated fan 82 is provided to ensure an air flow through the radiator 80 even when the combination 10 is stationary. Desirably the cooling system is self contained on the trailer unit 14. The radiator and fan 80, 82 are desirably located at a front of the trailer unit 14 for example in the position identified in FIG. 1. However the radiator and fan 80, 82 may be elsewhere on the trailer unit 14 provided as is convenient.

Figure 4:
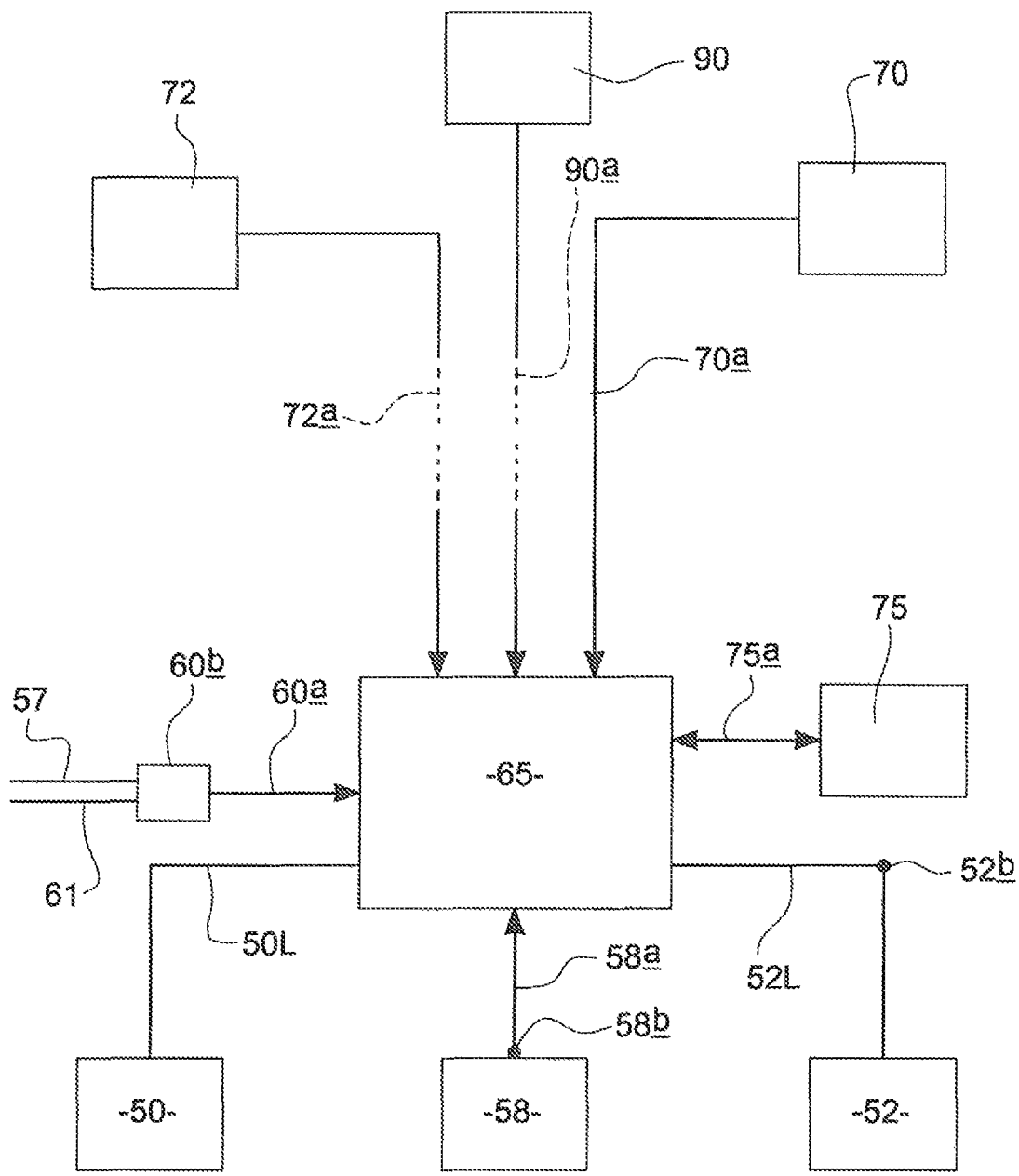
FIG. 4 is a diagram illustrating a control system of the combination of FIG. 1.

Referring now also to FIG. 4, the configuration and operation of the control system will be described.

Outputs from the controller 65 are electrically connected to each of the electrical motive machines 50, via a respective line 50L, and the clutches 52 via a respective line 52L, to control these. Inputs to the controller 65 include a line 58a from an electrical storage device 58 status detector 58b which detects the state of charge of the electrical storage device 58, a line 70a from the sensor device 70 which senses loads on the connecting pin 33, and a line 90a from a route input device 90 by means of which a driver or a remote operator can program into the controller 65, his proposed route a line 72a from a GPS device 72 which detects the global position of the combination 10. The controller 65 is also connected to a memory device 75 via a line 75a, the memory device 75 including mapping data relating to up and down inclines of terrain over which the combination is to travel.

For ease of understanding, the control system shown is simplified in that it will be appreciated that the controller 65 can control each of the two electrical motive machines 50 and clutches 52 for each of the ground engaging wheels 45a, 45b.

The lines 72a and 90a from the GPS device 72 and from the route input device 90 to the controller 65 are shown dotted to indicate that these devices 72, 90 which typically would be positioned in the cab 18, would need to be electrically connected along with other service connections between the tractor unit 12 and trailer unit 14. However, if desired the GPS device 72 and/or the route input device 90 could be located on the trailer unit 14 and control input to these devices provided by remote means such as wireless devices. It is within the scope of the invention for these devices 72, 90 to be controlled by an operator from a remote control station, such as from where the combination 10 is based, via a radio or other link. The route input device 72 at least, could be programmed by insertion of a token (e.g. a memory stick), which may carry a program and/or data relating to a prescribed proposed route.

The prime requirement of the controller 65 in normal drive mode is to operate the electrical motive machines 50 and/or the clutches 52 so as to minimise loads imposed on the connecting pin 33.

In one example, when the combination 10 is travelling at a steady rate along a generally straight flat road, e.g. with the longitudinal axis L' of the trailer unit 14 aligned with the longitudinal axis of the trailer unit 12, no or minimal loads will be imposed on the connecting pin 33 and thus the controller 65 may determine that no or minimal drive of the electrical motive machines 50 of the trailer unit 14 is required to maintain minimal loading on the connecting pin 33.

When the combination 10 travels up an incline though, there will be a tendency for the trailer unit 14 to decelerate relative to the tractor unit 12 thus imparting forces to the connecting pin 33. Such forces due to the tendency of the trailer unit 14 to decelerate will be experienced primarily by the second sensor part 72, and will be an "aft" load.

The controller 65 is programmed with a suitable algorithm so as to respond to the signal from the sensor device 70, such as to effect driving of the ground engaging wheels 45a, 45b by longitudinal clutches 52 if required, and by controlling the electrical motive machines 50 to drive as motors. The controller 65 controls the electrical motive machines 50 to give an increasing amount of drive to the trailer unit 14, until the input 70a from the sensor device 70 of the connecting pin 33 indicates minimal loads again imposed on the connecting pin 33.

When the combination 10 travels down an incline, there will be a tendency for the trailer unit 14 to accelerate relate to the tractor unit 12, thus imparting forces to the connecting pin 33. Such forces due to the tendency of the trailer unit 14 to accelerate relative to the tractor unit 14 will be experienced primarily by the first sensor part 71 of the sensor device 70, and will be a "fore" load.

The controller 65 is programmed with a control algorithm so as to respond to the signal from the sensor device 70, such as to provide a braking effect to the turning ground engaging wheels 45a, 45b, by engaging the clutches 52 if required, and by controlling the electrical motive machines 50 to act as electrical generators. The amount of braking effected by the electrical motive machines 50 may be varied, for example by varying the electrical resistance to the generated current, and thus to vary the power which is stored by the electrical storage device 58.

In accordance with the invention therefore a regenerative braking effect, without effecting operation of the braking devices 59, is achieved by controlling the electrical motive machines 50 to act as electrical generators to generate electrical power for storage by the electrical storage device 58.

When the tractor unit 12 is steered relative to the trailer unit 14 any fore and aft loads on the connecting pin 33 sensed by the sensor device 70 will reduce compared to the same conditions when the tractor unit 12 and trailer unit 14 are in longitudinal alignment L. L', commensurately with the angle between the tractor and trailer units 12, 14, about axis A, by virtue of the sensor device 70 which turns with the connecting pin 33 which is fast with the trailer unit 14. Thus any risk of the controller 65 for example controlling the electrical motive machines 50 in such a way as to overdrive the trailer unit 14 and possibly cause or aggravate the risk of "jack-knifing" is overcome.

Preferably the control algorithm is an adaptive algorithm.

In the event that the input 58a to the controller 65 indicates that the state of charge of the electrical storage device 58 is low, for example after sustained use of the electrical motive machines 50 to drive the ground engaging wheels 45a, 45b of the trailer unit 14, the control algorithm of the controller 65 may adapt the control regime to permit the state of charge of the electrical storage device 58 to be replenished. For example the controller 65 may preferentially control the electrical motive machines 50 for a period of time, to generate electrical power for storage even if this control does not minimise loads imposed on the connecting pin 33. Thus the power of the engine 15 of the tractor unit 12 may be used indirectly to charge up the electrical storage device 58 of the trailer unit 14, but more typically the controller 65 may simply not drive the ground engaging wheels 45a, 45b until the charge of the electrical storage device 58 is replenished to a desired level.

As well as the controller 65 being responsive to the local input 58a concerning the state of charge of the electrical storage device 58, and the local input 70a from the sensor device 70, the control algorithm may adapt the control regime to take account of the route the combination 10 will follow from its starting point to its destination.

By virtue of the route information provided by the input 90a and the mapping information 75, the controller 65 has data relating to the number of, and severity of up and down inclines along the route, and where these occur, and thus the control algorithm is able to predict the probable state of charge of the electrical storage device 58 at any position along the route and control the electrical motive machines 50, and possibly also the clutches 52, so that at least where the requirement for minimal loading on the connecting pin 33 is likely to provide the most benefit in terms of driver feel and fuel efficiency, the electrical storage device 58 will have sufficient charge to be operated to drive the ground engaging wheels 45a, 45b.

Similarly, where traffic congestion information is available, e.g. from a remote location, the adaptive control algorithm may adjust the control regime upon predicting the effect of the traffic congestion on the state of charge of the electrical storage device 58.

For example, in steady conditions, e.g. driving along a flat motorway, there may be little beneficial effect in controlling the electrical motive machines 50 to drive or to generate electrical power, in which case to minimise mechanical drag, the clutches 52 might be disengaged to preserve stored power.

During manoeuvring of the combination 10 (including higher speed steering and low speed steering) and/or when driving the combination up or down a steep hill, there would typically be greater benefit in controlling the electrical motive devices 50 to minimise loads imposed on the connecting pin 33, and thus the control algorithm may, by knowing the route information and the global position of the combination 10, and perhaps the state of traffic congestion along the prescribed route, adapt the control regime to ensure that the electrical storage device 58 is appropriately charged for the predicted forthcoming driving conditions where greater benefit may be obtained, by controlling the electrical motive machines 50 and/or the clutches 52 appropriately.

In FIG. 3 a traffic congestion information receiver is indicated at R, which provides a signal Ra to the controller 65.

In a preferred embodiment, the clutches 52 are spring released but are applied by pneumatic actuators which may be provided with pressurised compressed air (via a control valve 52b controlled by the controller 65) from the compressed air service line 57 connected to the tractor unit 12. However in another example the clutches 52 could otherwise be operated, e.g. by electrical actuators for example. The clutches 52 may be active clutches as described, or passive clutches which automatically engage/disengage depending on prevailing conditions.

It can be seen in FIG. 3 that a further input 60a is provide to the controller 65. This input is from a brake sensor 60b which senses the state of the control line 61 which is connected to the tractor unit 12, the control line 59 carrying control signals issued by the driver to effect braking of the combination 10, and the brake sensor 60b is also sensitive to the pneumatic pressure in the service line 57 connected to the tractor unit 12.

In the event of a loss of pneumatic pressure in the service line 57, for example due to engine 15 failure, damage to the service line 57 or otherwise, the clutches 52 will, where spring released and applied by pneumatic pressure, automatically disengage. Where the clutches 52 are otherwise actuated the controller 65 may issue a signal, or cease to issue a signal, with the effect that the clutches 52 will disengage.

The brake sensor 60b will also sense the absence of pneumatic pressure and will suspend the control system at least insofar as driving the ground engaging wheels 45a, 45b is concerned, so that the control system cannot interfere with the application of the fail safe "on" braking devices 59, and the brakes for the wheels on the axles 38, 39, to bring the combination 10 to a halt, if travelling.

The brake sensor 60b also senses when the brakes are applied while the combination 10 is being driven, and preferably at least suspends its control of the electrical motive machines 50, at least insofar as driving the ground engaging wheels 45a, 45b is concerned, during braking so that the control system does not interfere with the operation of the trailer unit 14 brakes, including the braking devices 59 of the auxiliary unit 46, by a trailer brake controller for example. The controller 65 may, as required still be able to control the electrical motive machines 50 to apply regenerative braking in appropriate circumstances, when the brake devices 59 are applied.

Various further modifications may be made without departing from the scope of the invention.

For example in the embodiments described the auxiliary unit 46 includes a pair of electrical motive machines 50, clutches 52 and transmissions 51, one for each ground engaging wheel 45a, 45b, but in another example a single electrical motive machine 50 could be provided for driving both of the ground engaging wheels 45a, 45b. In this event only one clutch 52 and transmission 51 may be provided, although possibly each ground engaging wheel 45a, 45b may also still have its own associated clutch 52 and/or a transmission 51.

A suitable transmission may be provided inside each hub 53 rather than between the electrical motive machine 50 or machines 50 and the clutch(es) 52. The hubs 53 may mount more than one ground engaging wheel 45, 45b at each trailer unit 14 side, which multiple wheels would be coupled to rotate together.

The provision of a control system which includes the ability to use positional and route information (and traffic congestion information) is optional. Where positional and route information is used, the mapping information may not be provided in a memory 75 connected to the processor of the controller 65 on the trailer unit 14, but such mapping information (and/route information) may be provided to the combination 10 from a remote station. Thus in the event of route changes from a proposed route, the route information and mapping information may be automatically updated depending upon the positional information. The positional information input device 72 may be part of or work in conjunction with a positional navigation system which guides the driver.

The combination of the invention may be provided by building a trailer with the necessary equipment, in which case the electrical motive machine or machines 50, clutch(es) 52, etc. need not be provided by an auxiliary unit 46 which is fitted to an existing trailer unit 14, but may be provided as original equipment. The ground engaging wheels 45a, 45b which are driveable by the electrical motive machine(s) 50 etc. may be the only ground engaging wheels such that the axles 38, 39 in the embodiment drawn in FIG. 1 need not be provided.

Thus a tractor unit 12 and trailer unit 14 combination may include any number of pairs of wheels, and one pair, more than one pair or all the ground engaging wheels may be driven, and used to apply regenerative braking, to minimise load on the connecting pin, as described above for the wheels 45a, 45b of the auxiliary unit 46.

Where an existing trailer unit 14 is adapted, the auxiliary unit 46 may be provided in the place of an existing axle and wheel assembly, or may be added to the existing structure.

The invention has particular advantage where the trailer unit 14 is generally self contained so that no or minimum service connections need to be made between the tractor unit 10 and the trailer unit 14. Hence desirably the connecting pin 33 and sensor device 70 is provided on the trailer unit 14, together with the controller 65 and electrical storage device 58. Thus a trailer unit 14 thus adapted or built may be used with existing tractor units 10. However the connecting pin 33 and opening 21 to receive the connecting pin 33 could be transposed, and connections between the tractor unit 10 and the trailer unit 14 made to convey data between them, or at least some of the control system and/or the electrical storage device could be provided on a tractor unit 10.

With the preferred embodiments described though where the trailer unit 14 is largely independent of the tractor unit 12, a combination of the invention may readily be provided by adapting an existing trailer unit 14 by mounting the auxiliary unit 46, and the electrical storage device 58, and the control system on the trailer unit as described, without any major modification of the existing trailer unit 14.

If desired, to enable the electrical storage device 58 to be at least partially charged in adverse driving conditions e.g., on a route where there are many more inclines than declines, the trailer unit 14 could be provided with an auxiliary generator which may be operated in such adverse conditions.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. In combination, a tractor unit and a trailer unit, the tractor unit and the trailer unit being coupled by a connection device which permits of relative angular movement between the tractor unit and the trailer unit about a generally upright axis, the connection device including a connecting pin which extends from a connecting surface of one of the trailer unit and the tractor unit, and is in use received in an opening in a connecting surface of the other of the tractor unit and the trailer unit, the connecting pin including a sensor device to sense loads imposed on the connecting pin as the trailer unit tends to decelerate or accelerate relative to the tractor unit, there being a control system, including a controller, the controller receiving signals from the sensor device of the connecting pin representative of the loads imposed on the connecting pin, the trailer unit including a pair of ground engaging wheels, one at each side of the trailer unit, at least one electrical motive machine which is capable of being electrically driven by power from an electrical storage device to provide drive to drive at least one of the ground engaging wheels to tend to accelerate the trailer relative to the tractor unit, and of generating electrical power for storage by the electrical storage device, in response to the trailer unit tending to accelerate relative to the tractor unit, and wherein the controller in use, controls the electrical motive machine in response to the signals from the sensor device to reduce the loads imposed on the connecting pin, wherein the connecting pin has a generally circular cross-section and wherein the sensor device includes spaced apart first and second sensor parts, wherein the first and second sensor parts are at spaced apart diametrically opposed locations relative to the circular cross section of the connecting pin and are configured to sense loads at diametrically opposite positions of the connecting pin during relative angular movement between the tractor unit and the trailer unit.

2. The combination according to claim 1 wherein the connecting pin of the connection device is provided on the trailer unit, and the opening in which the connecting pin is in use received is provided in a connecting surface of the tractor unit.

3. The combination according to claim 1 wherein the controller of the control system is provided on the trailer unit.

4. The combination according to claim 1 wherein the electrical storage device is provided on the trailer unit.

5. The combination according to claim 1 wherein the control system of the trailer unit is substantially independent of the tractor unit.

6. The combination according to claim 1 wherein, when the tractor unit and the trailer unit are in longitudinal alignment so that drive wheels of the tractor unit are in straight ahead positions in line with the ground engaging wheels of the trailer unit, the first sensor part senses loads at a forwardly facing region of the connecting pin as the trailer unit tends to decelerate relative to the tractor unit, and the second sensor part senses loads at a rearwardly facing region of the connecting pin as the trailer unit tends to accelerate relative to the tractor unit.

7. The combination according to claim 1 wherein the first and second sensor parts are carried by the connecting pin, and as the trailer unit turns relative to the tractor unit, the sensor device turns with the trailer unit.

8. The combination according to claim 1 wherein the sensor device is of the kind which senses local strains by changing electrical resistance.

9. The combination according to claim 1 wherein the electrical motive machine is capable of providing variable drive to the or each ground engaging wheel when in a drive mode in which the electrical motive machine drives at least one of the ground engaging wheel, and is capable of providing a variable resistance braking effect when operated in an electrical generating mode in which the electrical motive machine generates electrical power for storage by the electrical storage device.

10. The combination according to claim 1 wherein to enable drive between the electrical motive machine and the ground engaging wheel or wheels to be isolated, there is provided a clutch apparatus.

11. The combination according to claim 10 wherein the clutch apparatus is between the wheel and the electrical motive machine, the clutch apparatus being controllable to engage and disengage drive by the controller.

12. The combination according to claim 10 wherein the controller engages and disengages the clutch apparatus to fulfill control criteria of a control algorithm.

13. The combination according to claim 12 wherein when the level of the electrical power of the electrical power storage device falls below a predetermined threshold, the controller, in accordance with the control algorithm, controls the clutch apparatus and the electrical motive machine such as to increase or maximize the generation of electrical power for storage, so that the electrical power of the electrical power storage device is restored above the predetermined threshold.

14. The combination according to claim 12 wherein the control algorithm is responsive to inputs from a location remote from the combination.

15. The combination according to claim 14 wherein the control system has an input to receive information relating to a geographic position of the combination which provides a positional input, and an input to receive route information relating to a proposed route of the combination, and the control system includes a control algorithm which uses the positional and route information in a control regime which seeks to ensure that the electrical storage device does not become depleted of electrical power beyond a predetermined level as the combination travels from a starting location to a destination along the proposed route.

16. The combination according to claim 15 wherein the positional and/or route information includes information relating to the number and severity of up and down inclines, and turns and straights along the proposed route, the control algorithm, from such information, predicting the state of charge of the electrical storage device along the proposed route, and predicting the electrical power which will be required along the proposed route, in order to operate the combination to reduce loads imposed on the connecting pin.

17. The combination according to claim 15 wherein the positional information is provided by a Global Positioning System.

18. The combination according to claim 1 wherein the trailer unit includes a storage area to accommodate the electrical storage device.

19. The combination according to claim 18 where the trailer unit include a decking for carrying a load to be transported, the decking being supported by a chassis.

20. The combination according to claim 19 wherein the chassis includes a pair of longitudinally extending chassis members, the storage area being provided between the pair of longitudinally extending chassis members.

21. The combination according to claim 20 wherein the electrical storage device is supported by a cradle which is readily mountable and dismountable relative to the chassis members.

22. The combination according to claim 20 wherein the storage area is positioned generally centrally across the trailer unit width, and between the wheels and the connecting pin.

23. The combination according to claim 20 wherein the controller of the control system is stored in the storage area.

24. The combination according to claim 1 wherein the ground engaging wheels of the trailer unit are brakable by one or more braking devices, the braking devices being controlled by a brake controller in response to braking commands provided by a driver in a cab of the tractor unit.

25. The combination according to claim 24 wherein the controller of the control system suspends its control of the at least one electrical motive machine when the brakes are applied such as would otherwise provide drive to the at least one ground engaging wheel.

26. The combination according to claim 1 wherein at least one of the ground engaging wheels of the trailer unit is driven by the at least one electrical motive machine, wherein a clutch apparatus is provided between the at least one electromotive machine and the at least one of the ground engaging wheels, and wherein the at least one electrical motive machine and the clutch apparatus are provided as an auxiliary unit which is in use secured to a chassis of the trailer unit by a suspension.

27. The combination according to claim 26 in which both of the pair of ground engaging wheels are driven by the at least one electrical motive machine, with there being a clutch apparatus for each wheel which is controlled by the controller to engage and disengage drive between each wheel and the at least one electrical motive machine.

28. The combination according to claim 1, wherein the connecting pin is received in an opening provided on the tractor unit, to provide a connection device which permits of relative angular movement between the tractor unit and the trailer unit, wherein the connecting pin includes the sensor device, wherein an auxiliary unit which includes the at least one electrical motive machine is mounted on a chassis of the trailer unit, the controller is mounted on the trailer unit, and the electrical storage device is mounted on the chassis of the trailer unit.

29. The combination according to claim 1 wherein the controller controls the electrical motive machine by providing electrical power from the electrical storage device to drive the at least one of the pair of ground engaging wheels or permits the electrical motive machine to generate electrical power for storage in the electrical storage device in accordance with a control algorithm to reduce loads imposed on the connecting pin in use.

\* \* \* \* \*